April 16, 1968 D. W. SMITH 3,378,265

PIVOTALLY MOUNTED ADAPTER

Filed Jan. 20, 1966 3 Sheets-Sheet 1

Inventor
Douglas W. Smith
By Brown, Jackson, Boettcher & Dienner
Att'ys.

Inventor
Douglas W. Smith
By Brown, Jackson, Boettcher & Dienner
Att'ys.

Inventor
Douglas W. Smith
By Brown, Jackson, Boettcher & Dienner
Attys.

United States Patent Office 3,378,265

Patented Apr. 16, 1968

3,378,265

PIVOTALLY MOUNTED ADAPTER

Douglas W. Smith, St. Joseph, Mich., assignor to V-M Corporation, Benton Harbor, Mich., a corporation of Michigan Filed Jan. 20, 1966, Ser. No. 521,986
12 Claims. (Cl. 274—10)

ABSTRACT OF THE DISCLOSURE

A phonograph capable of playing large and small centerhole records provided with a turntable having a recess in the record support surface thereof, and a first center spindle for supporting and lowering small centerhole records onto the turntable for playing. The phonograph is also adapted for playing large centerhole records by means of a unitary second spindle which is coupled to the first center spindle through an annular bearing rotatably and axially slidable on the first center spindle. The second spindle is pivotally supported on the bearing and has a recess in one side thereof to releasably partially enclose the first spindle when in an upstanding operative position, and is pivotable to an inoperative position within the recess in the turntable.

This invention relates to record players and, more particularly, to record players adapted to reproduce sound from record discs having different size center holes.

It is well known in the present state of the record playing art to provide record players with multiple speed drive means for playing 16, 33, 45 and 78 r.p.m. records. The conventional practice is to stack a number of records upon a spindle disposed normal to the center of a turntable and to dispense individual records to playing position in a record changing cycle in which a tone arm is concurrently moved to a position which clears the way for the record to drop upon the turntable and is then returned to its record playing position. The traditional small center hole records for 16, 33 and 78 r.p.m. playing have, in recent years, yielded somewhat in popularity to the larger center hole 45 r.p.m. record discs which are primarily utilized for recording the "popular" musical works. The 45 r.p.m. records thus require a different size support spindle than that required for the small center hole record discs.

The prior art record playing devices have attempted to satisfy the requirements for an enlarged diameter spindle for use in conjunction with 45 r.p.m. records by providing a separate spindle adapter which may be manually slipped over and seated upon a conventional small diameter spindle. Inherent disadvantages of separate spindle adapters are that they are easily misplaced when not in use and are prone to malfunction from continued mounting and removal. Attempts have also been made in the prior art devices to provide a 45 r.p.m. record spindle adapter which is connected to the record player in such a manner as to be movable to a position wherein the small diameter spindle may be used without interference with the large spindle adapter. These attempts to incorporate a 45 r.p.m. adapter spindle into the record player have, however, required a rather complex arrangement of parts which are not only expensive to manufacture, but are subject to malfunction and breakdown.

It is a primary object of the present invention, therefore, to provide a record player having a new and improved retractable adapter spindle which overcomes the above-mentioned disadvantages and avoids the complexities of the prior art.

Another object of the present invention is to provide a record player having an adapter spindle which is pivotally and rotatably mounted upon a small diameter spindle such that it may be readily moved to an inoperative position within the record turntable when the small diameter spindle is to be used and is also adapted for positive mounting on the small diameter spindle when the adapted spindle itself is to be used.

A feature of the present invention is that the adapter spindle is so constructed and mounted upon the turntable that both large and small apertured record discs may be automatically dispensed to a turntable for play back.

Thus, the present invention provides an improved retractable adapter spindle which, when pivoted upward to a partially enclosing operative position about the small center spindle, effects automatic dispensing of large center hole record discs through operation of the automatic dispensing means of the small diameter spindle.

It is also a feature of this invention that it provides a record player having an improved automatic adapter spindle which allows ease of manufacture and operation and further allows a more compact record player than is provided in the present state of the art.

In accordance with the invention, a phonograph for reproducing sound from record discs includes a rotatable turntable having a record supporting surface which is provided with a radially disposed recess. A conventional small diameter spindle record changing assembly is provided coincident with the axis of rotation of the turntable and includes means to support a plurality of small center hole records above the turntable and individually dispense the records onto the turntable for play back. A bearing member is rotatably mounted upon the small diameter spindle and is axially slidable thereon. The bearing member pivotally supports an adapter spindle provided to support large center hole record discs, such as 45 r.p.m. records, and which may also be provided with means operated by the ejecting mechanism in the small center spindle to permit automatic dispensing of individual record discs onto the turntable supporting surface for play back. A recess or opening is provided in one side of the adapter spindle to receive the small diameter spindle when the adapter spindle is in a raised or operative position. A pair of longitudinally extending ribs integral with the adapter spindle cooperate with a lip on the upper end of the recess or opening to form a releasable locking means for retaining the adapter spindle in its upward operative position. The spaced longitudinal ribs engage the peripheral surface of the small spindle, while the lip engages the upper end of the small spindle to retain the adapter spindle in a fixed position relative to the small diameter spindle. The outer edge of the lip is beveled or cammed to facilitate entry of the small diameter spindle into the recess or opening in the adapter spindle. The adapter spindle, being pivotally mounted to the bearing member, can be located in a lowered or inoperative position within the turntable recess, allowing the small diameter spindle to be used without interference with the adapter spindle.

Further objects and advantages of my invention, together with the organization and manner of operation thereof, may best be understood by reference to the following description taken in connection with the accompanying drawings, in the several figures of which like reference numerals identify like elements, and in which.

Figure 1:
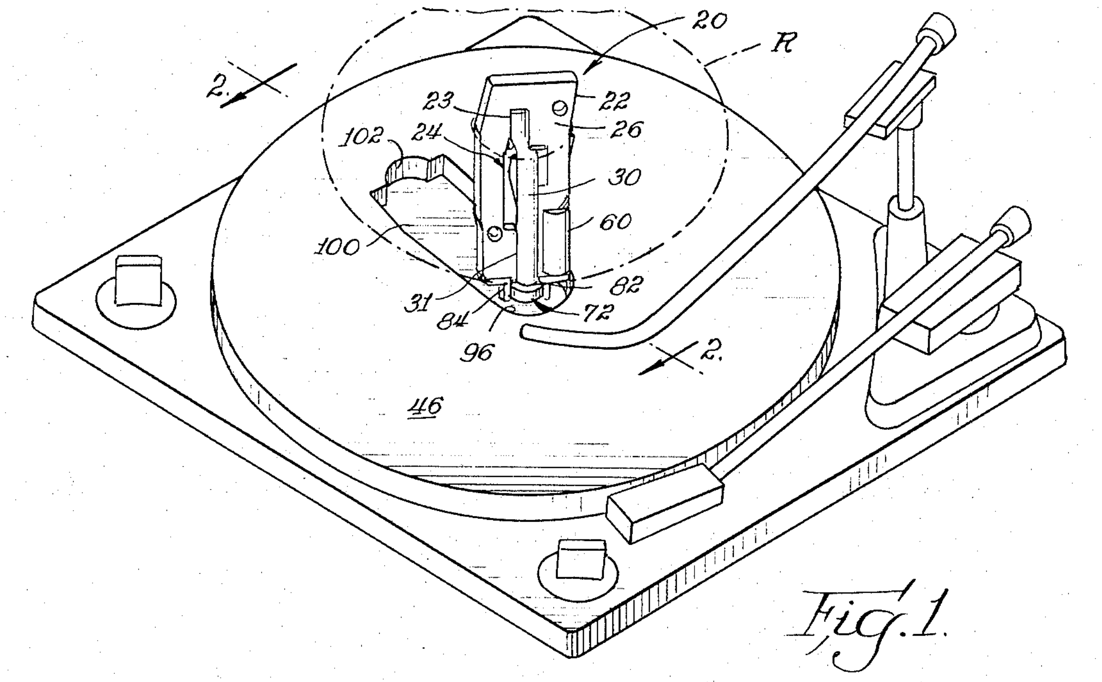
FIGURE 1 is a perspective view illustrating a retractable adapter spindle according to the present invention showing the adapter spindle in a raised operative position and receiving the small diameter spindle within the recess of the adapter spindle.

Referring now to the drawings, FIGURE 1 illustrates a differential speed record player embodying the present invention provided with a small center spindle 30 on which small center hole records may be located and having an adapter spindle 20 pivotally mounted on the small center spindle, as will hereinafter be described, on which a plurality of records R of the type having large center holes, such as found in 45 r.p.m. records, may be located.

Figure 2:
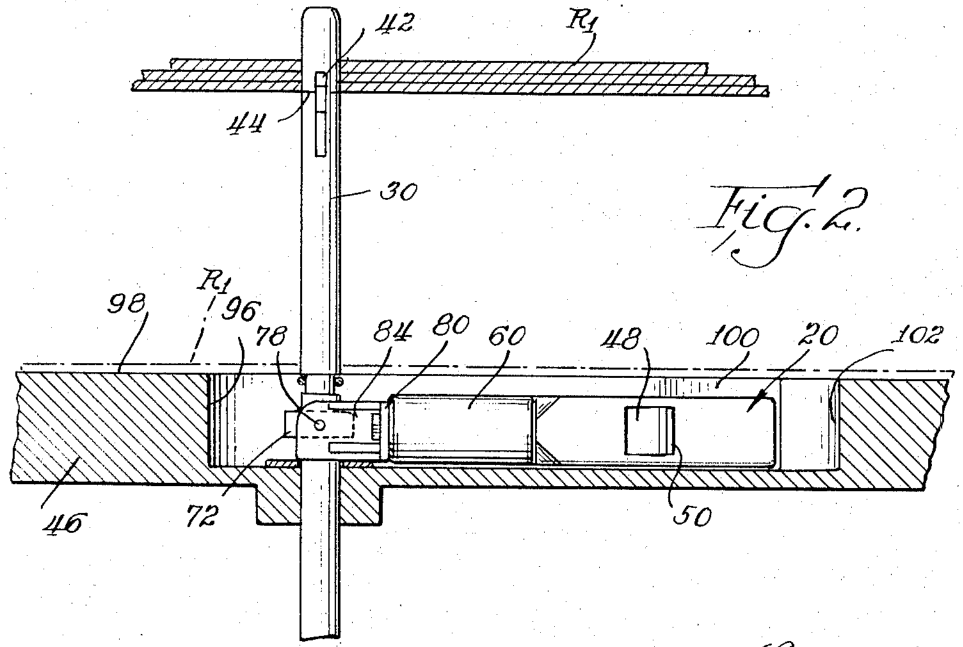
FIGURE 2 is a fragmented vertical view, partly in section, showing the adapter spindle in a lowered, inoperative position within the recess of the turntable and allowing the small diameter spindle to be used without interference with the adapter spindle.

The small diameter spindle 30 (FIGURE 4) may be of conventional structure comprising a cylindrical body member 32, an offset upper end portion 34, an upper slidable member 36, an axially slidable actuator rod 38, a ball 40, and an ejector lever 42. When the small diameter spindle 30 is used in conjunction with the playing of small center hole records with the adapter spindle 20 in a lowered or inoperative position, as shown in FIGURE 2, a shoulder 44 formed on the spindle 30 supports a plurality of records $R_1$ of the type customarily found in 33 and 78 r.p.m. records. It will be understood that when the small diameter spindle 30 is operated with the adapter spindle 20 in an inoperative position, the ejector lever 42 is adapted to individually push records $R_1$ off the shoulder 44 to thereby dispense them onto a rotatable turntable 46 for play back.

Figure 3:
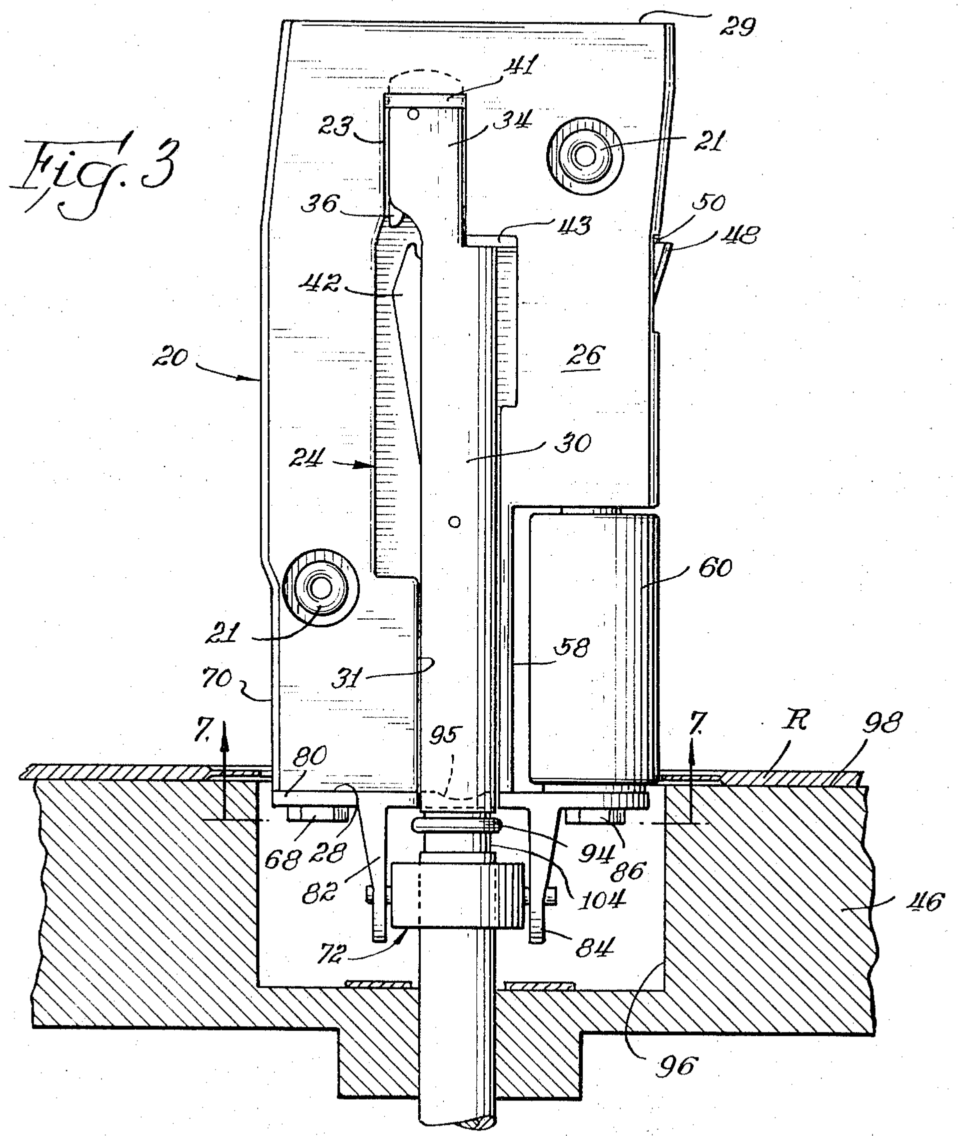
FIGURE 3 is a fragmented vertical view, taken partly in section through the turntable, and shows the raised adapter in side elevation to illustrate more clearly the recess in the adapter.

Referring to FIGURES 1 and 3, the adapter spindle 20 includes a housing 22 which is shown generally rectangular in cross section when considered in a plane transverse to its longitudinal axis and has a recess, indicated generally at 24, which opens into a side wall 26 of the housing 22. The recess 24 also opens into a bottom end 28 of the housing 22 and extends substantially longitudinally of the housing 22 to adjacent, but short of, the top wall 29 thereof, whereby it may be adapted to partially enclose the small diameter spindle 30. The width of the recess 24 is shown varying along the length of the recess, with an upper portion 23 of the recess 24 being slightly offset relative to a lower portion 31 thereof. However, if desired, the width of the recess may be constant. In either event, the width and depth of the recess 24 are of such dimension that the small diameter spindle 30 may pass therethrough and be readily received within the body of the adapter spindle 20 when it is pivoted to an upright operating position, as will become apparent hereinbelow. A pair of substantially longitudinally extending locating ribs 31 and 33, preferably formed integral with the adapter housing 22, are spaced apart to constitute retention means into which the upper offset end 34 of the spindle 30 is snugly and/or resiliently received. If desired, rib 31 may be a separately attached leaf spring tensioned to engage and grip the spindle between itself and rib 33 when the adapter spindle is positioned in an upward position, as illustrated.

Figure 6:
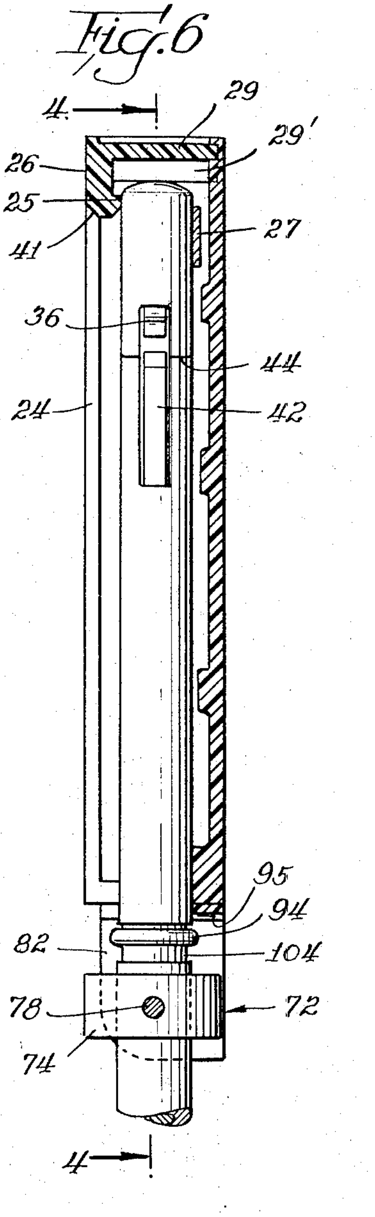
FIGURE 6 is a vertical section taken substantially along the line 6—6 of FIGURE 4.

Th adapter housing 24 has a depending lip portion 25 (FIGURE 6) at the upper end of the recess 24, which lip portion 25 forms with a generally U-shaped clip 27 a cavity or extended relief to receive an upper end 35 of spindle 30 to thereby seat the adapter spindle 20 about the small diameter spindle 30 in substantially fixed relation when the adapter spindle 30 is in an upright operative position. The adapter housing 22 is preferably made of two sections secured together in any suitable manner such as by rivets 21 having their ends flared, and thus allows the clip 27 to be mounted upon ribs 31 and 33 prior to assembly of the two housing section. The recess 24 is shorter in length than the length of the spindle 30 above the point where the spindle 30 passes through a turntable 46 so as to permit a slight vertical lifting of the adapter spindle 20 on the spindle 30 when raising the adapter spindle 20 to an operative position wherein the aforementioned cavity or extended recess receives the upper end 35 of the spindle 30. The edge of the recess 24 defining the intersection of the recess with the side wall 26 of the adapter housing 22 is chamfered at 41 and 43 to provide leads which assist in guiding the small diameter spindle 30 into the recess 24 when the spindle adapter 20 is raised to an upright operative position.

Downward movement of the adapter spindle 20 on the small diameter spindle 30 is limited by engagement of portion 29' of the upper end 29 of the housing 22 with the upper end 35 of spindle 30. Axial movement of the adapter housing 24 on the small diameter spindle 30 is limited in an upward direction by engagement of a bearing member 72 with an O ring 94 (FIGURES 3 and 4) mounted in an annular groove 104 on the spindle 30. The O ring 94 may be made of rubber or other material which permits ease of assembly and is resistant to decay and wear. It will be seen that in raising the adapter spindle 20 from a lowered position within a recess 100 in the turntable 46 (FIGURE 2) to an upright operative position, it is merely necessary to orient the recess 24 in adapter spindle 20 with the small diameter spindle 30 and then push the adapter housing 22 forward, such that the chamfers 41 and 43 guide the small diameter spindle 30 into engagement between the retention ribs 31 and 33 and then to move the adapter housing downwardly to seat the upper end 35 of the small diameter spindle behind the lip portion 25, thus providing a releasable locking of the adapter housing on the small diameter spindle.

The adapter spindle 20 is itself provided with record feeding mechanism, including a record supporting shelf 48, a separator blade 50, a spring 52 for biasing the shelf member radially outwardly, a spring 54 for biasing the separating blade radially inwardly, and a pivotally mounted bell crank lever 56 for retracting the shelf member 48 whenever the separator blade 50 is extended. The foregoing record feeding and dispensing mechanism of the adapter spindle 20 is more fully described in the copending application of Richard W. Simpson, Ser. No. 325,690, filed Nov. 22, 1963, and assigned to the assignee of the present invention.

Figure 7:
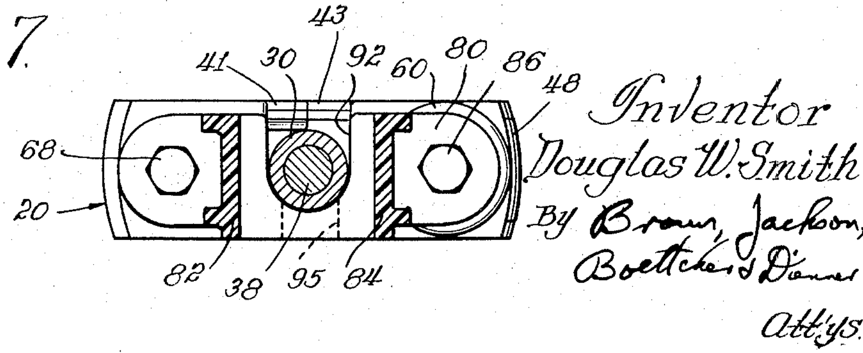
FIGURE 7 is a horizontal section taken along the line 7—7 of FIGURE 3.
Figure 4:
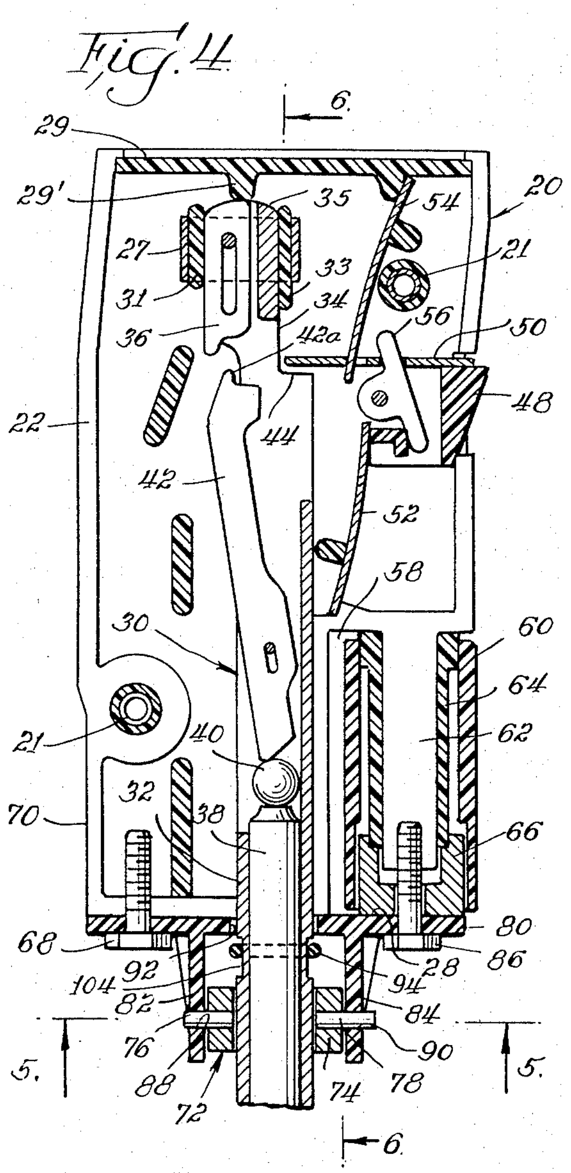
FIGURE 4 is a vertical section, partly broken away, of the apparatus of FIGURE 1, illustrating the manner in which the adapter spindle is pivotally mounted to the small diameter spindle and the interconnection between the record dispensing means of the adapter spindle and the small diameter spindle.
Figure 5:
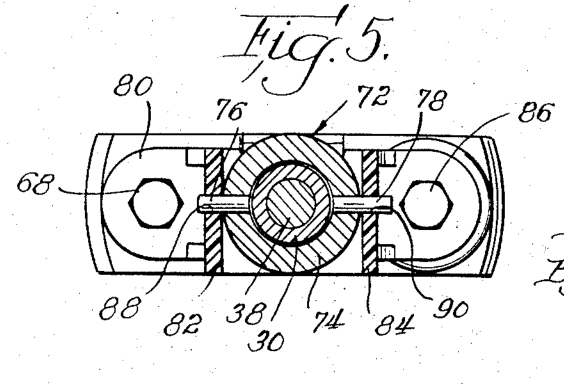
FIGURE 5 is a horizontal section taken substantially along the line 5—5 of FIGURE 4.

Referring now to FIGURE 3, considered with FIGURES 4 and 5, the pivotal connection of the adapter housing 22 to the spindle 30 is effected through a bearing member, shown generally at 72, which is rotatably mounted on the lower portion of the small diameter spindle 30 and is axially slidable thereon. The bearing member 72 comprises an annular ring portion 74 (FIGURE 5) having a generally cylindrical bearing surface engageable with and slidable along the peripheral lower portion of spindle 30 and a pair of cylindrical pin supports 76 and 78 secured integral therewith. The pin supports 76 and 78 project radially from the annular ring portion 74 on diametrically opposite sides of the ring and are received respectively through apertures 88 and 90 in downwardly depending legs 82 and 84 of a pivot bracket 80 to pivotally support the pivot bracket. The pivot bracket 80 is fixedly secured to the bottom end 28 of the adapter housing 22 by screws 68 and 86. As best illustrated in FIGURE 7, the pivot bracket 80 is provided with a central recess 92 which is large enough to receive the small diameter spindle 30 in spaced relation when the adapter spindle 20 is in an upright operating position. A relief 95 may be provided in the pivot bracket surface which abuts the lower end 28 of adapter housing 22 to allow flexing of the pivot bracket legs 82 and 84 when assembling the pivot bracket 80 and bearing member 72. Considering then the described connection, it will be seen that the adapter housing 22 is free to pivot about pins 76 and 78 and is also free to move axially on the spindle 30 by reason of the sliding engagement of bearing 72 about spindle 30 to accommodate the desired locking of the adapter spindle housing 22 to the small center spindle 30, as described hereinabove.

The turntable 46 includes a central recessed well portion 96 of circular configuration having a diameter large enough to receive the lower end of the adapter spindle 20 including a centering roller 60 to be hereinafter described. The bearing member 72 is mounted on the spindle 30 at a point below a plane defined by a record support surface 98 on the turntable 46 such that the aforementioned lower end of the adapter spindle 20 and the centering roller 60 will extend downwardly through the center hole of a large centerhole record disposed on the record support surface 98.

Referring to FIGURES 1 and 2, the turntable 46 has a radially extending recess 100 opening into the record support surface 98 and intersecting the central recess 96. The length and width of the recess 100 are such as to readily receive the adapter spindle 20 when it is pivotally lowered to an inoperative position. The depths of the recess 100 and the central recess 96 are shown equal and should be sufficient to allow the adapter spindle to lie completely below the plane of the turntable support surface 98 when in an inoperative position and to be freely pivotable therefrom to an upright operative position about the spindle 30. A radial extension 102 is provided in the recess 100 and constitutes a finger hole in the turntable support surface 98 to facilitate raising the adapter spindle 20 from an inoperative position within the recess 100, as shown in FIGURE 2, to an upright operative position, as shown in FIGURE 1.

In the illustrated form of the invention, the adapter spindle housing 22 is substantially recessed at one side thereof adjacent its lower end to form a chamber or well 58 (FIGURES 3 and 4) to accommodate a centering roller 60. The diameter of the roller 60 is substantially less than one-half of the diameter of the center hole in a record R having a large center hole of approximately 1.5 inches. The roller 60 is rotatably mounted on a vertical pin 62, which is formed integral with the adapter spindle housing 22, and may be retained on the pin 62 in any suitable manner, such as by a spacer bearing 64 and retainer bearing 66, provided on the bracket 80, and a screw 68. The roller 60 is cylindrical in cross section and positioned such that the radially outermost portion thereof is spaced from the central axis of the turntable 46 by a distance equal to one-half the diameter of the center hole of a large center hole record R. Thus, when the turntable is rotating during operation of the phonograph, the roller 60 serves to accurately center any records R which are disposed thereon. It will be understood that other than cylindrical centering rollers could be used in accomplishing record centering or that more than one such centering roller might be used, such other recording centering means being described in the above cited Simpson application, Ser. No. 325,690. The housing 22 is also recessed at its lower end portion 70, opposite the roller 60, such that no portion of the housing 22 will engage the periphery of the center hole of a record which is centered on the turntable 46 for play back.

In operation, the adapter spindle 20 may be raised to an upright operative position to provide for automatic record changing of large center hole records R, as shown in FIGURE 1, or lowered to an inoperative position wherein it is received within the recess 100 in the turntable 46 to allow the small spindle 30 to be used for automatic record changing of conventional small center hole records $R_1$, in a known manner, as shown in FIGURE 2. In the lowered or inoperative position shown in FIGURE 2, the adapter spindle 20 is stored wholly below the record supporting surface 98 of the turntable 46, thus precluding interference of the adapter spindle 20 with the use of the small diameter spindle 30. The bearing member 72, by which the adapter spindle 20 is pivotally as well as rotatably and slidably mounted on the small diameter spindle 30, permits the spindle 20 to freely rotate about the small diameter spindle 30 when the adapter spindle is in a lowered inoperative position.

When raising the adapter spindle from an inoperative to an operative position, it is merely necessary to grasp the spindle 22, using the finger hole 102 to gain access thereto, and while pivoting it about pins 76 and 78 also rotate it about the small diameter spindle 30 until the recess 24 in the adapter spindle is in alignment with the spindle 30. This alignment exists when the upper offset portion 23 of recess 24 will readily receive the upper offset portion 34 of the small diameter spindle 30. Simultaneously, the adapter spindle 20 is also lifted slightly vertically so that it can be pushed over spindle 30 to locate the ribs 31 and 33 about spindle 30. The adapter spindle is then vertically lowered so as to locate the upper end 35 of spindle 30 behind lip portion 25 whereby it is positively gripped about the spindle and held in a fixed relation thereto with the blade memory 50 properly located and fixed for operation by engagement with face **42*a* of ejector lever 42 as described above in the referenced copending application. Conversely, when it is desired to return the adapter spindle 20 to an inoperative position, the adapter spindle is easily removed from the small spindle 30 by simply raising the housing vertically until the lip 25 has been raised above the upper end 35 of the spindle 30 whereupon the housing may be pivoted away from the small spindle and lowered into the recess 100 and turntable 46, thus allowing the small diameter spindle 30 to be used without interference with the adapter spindle 20**.

While a particular embodiment of my invention has been shown and described, it will be obvious to those skilled in the art that changes and modifications may be made without departing from the invention in its broader aspects, and therefore, the appended claims cover all such changes and modifications as fall within the true spirit and scope of my invention.

I claim:

1. In a phonograph of the type capable of reproducing sound from various size record discs at different rotational speeds, the combination comprising a rotatable turntable having a record disc support surface and a recess therein, a first spindle member having a diameter for locating a record disc having a small center hole in playing position on said turntable, a bearing member rotatably mounted on said first spindle and axially movable thereon, a unitary second spindle member pivotally mounted on said bearing member and axially movable therewith, said second spindle having a diameter for locating a record disc having a large center hole in playing position on said turntable, said second spindle member having a side portion including a recess therein to receive said first spindle member when said second spindle member is pivoted to an operative position partially enclosing said first spindle, and means operative upon axial movement of said second spindle member for releasably locking said second spindle on said first spindle, said second spindle member being pivotable to an inoperative position within said turntable recess whereby said first spindle member may be used without interference with said second spindle member.

2. The combination of claim 1 wherein said first and second spindle members each includes means to support and individually dispense record discs upon said turntable, said second spindle being pivotal on said bearing member so as to locate its dispensing means for engagement by said first spindle member dispensing means to effect operation of said second spindle dispensing means when said second spindle member is locked in an operative position on said first spindle.

3. The combination of claim 1 wherein said releasable locking means comprises a lip portion on said second spindle member defining a cavity to receive-was inserted the upper end of said first spindle member when said second spindle member is in operative position to thereby maintain a fixed relative position of said first and second spindle members.

4. A phonograph according to claim 1 wherein said bearing member comprises an annular ring having support pins secured thereto, said support pins extending radially from said annular ring and serving to pivotally support said second spindle member thereon.

5. The combination according to claim 1 wherein said first spindle member includes a means to limit the axial movement of said bearing member thereon.

6. The combination of claim 1 wherein said recess in said turntable is radially disposed to the axis of rotation of said turntable and of a depth such that said second spindle lies below a plane defined by said support surface when in said inoperative position.

7. The combination according to claim 6 wherein said turntable recess has a finger hole at its outer end to facilitate raising said second spindle means from an inoperative to an operative position.

8. The combination of claim 1 wherein said turntable is recessed adjacent its axis of rotation to receive said bearing member and the lower end of said second spindle member below a plane defined by said turntable support surface.

9. The combination of claim 1 wherein said releasable locking means comprises a lip portion disposed on said second spindle member adjacent the upper end of said recess and adapted to engage the upper end of said first spindle member when said second spindle member is pivoted to an operative position, said lip portion being releasable from said first spindle member upon upward movement of said second spindle prior to pivotal movement thereof to a downward inoperative position.

10. The combination defined in claim 1 wherein said releasable locking means comprises a pair of longitudinally extending rib members integral with said second spindle member, said rib members being adapted to receive said first spindle member therebetween and thereby lock said second spindle member in partially encircled relation to said first spindle member when said second spindle member is rotated to an operative position, said rib members being releasable from said first spindle member to allow said second spindle to be pivoted to an inoperative position.

11. The combination of claim 1 wherein said releasable locking means comprises a lip portion disposed on said second spindle member adjacent the upper end of said recess, said lip portion cooperating with longitudinally extending rib members on said second spindle to form a cavity in said second spindle to receive said first spindle member in fixed relative position to said second spindle member when said second spindle member is in a raised operative position.

12. A phonograph according to claim 1 wherein said first and second spindle members each includes means to support and individually dispense record discs upon said turntable for playback, said second spindle member dispensing means being operable by actuation of said first spindle member dispensing means, said releasable locking means including a lip portion on said second spindle member adjacent the upper end of said spindle recess, said lip portion cooperating with a pair of longitudinally extending rib members integral with said second spindle member to form a cavity to receive the upper end of said first spindle member when said second spindle member is raised to an operative position, and said first spindle member including means to limit the axial movement of said bearing member whereby said second spindle member may be pivoted to a generally upstanding position and moved vertically such that said cavity receives said first spindle member to thereby maintain a fixed operative position of said second spindle member relative to said first spindle member.

References Cited

UNITED STATES PATENTS

| | | | |
|---|---|---|---|
| 3,107,098 | 10/1963 | Hardy | 274—10 |
| 3,163,427 | 12/1964 | Tatter | 274—10 |
| 3,240,499 | 3/1966 | Rankin | 274—10 |
| 3,301,562 | 1/1967 | Tatter | 274—10 |

LEONARD FORMAN, *Primary Examiner.*

J. M. FREED, *Assistant Examiner.*

UNITED STATES PATENT OFFICE

CERTIFICATE OF CORRECTION

Patent No. 3,378,265 April 16, 1968

Douglas W. Smith

It is certified that error appears in the above identified patent and that said Letters Patent are hereby corrected as shown below:

Column 7, line 10, cancel "-was inserted".

Signed and sealed this 9th day of September 1969.

(SEAL)
Attest:

Edward M. Fletcher, Jr.
Attesting Officer

WILLIAM E. SCHUYLER, JR.
Commissioner of Patents